US012574395B2

(12) United States Patent
Narayanaswamy et al.

(10) Patent No.: US 12,574,395 B2
(45) Date of Patent: Mar. 10, 2026

(54) DATA UNIT CAPTURE MANAGEMENT

(71) Applicant: Cisco Technology, Inc., San Jose, CA (US)

(72) Inventors: Ganesh Narayanaswamy, Sunnyvale, CA (US); Vijay Chander, San Ramon, CA (US); Mark Landgrebe, Marina Del Rey, CA (US)

(73) Assignee: Cisco Technology, Inc., San Jose, CA (US)

( * ) Notice: Subject to any disclaimer, the term of this patent is extended or adjusted under 35 U.S.C. 154(b) by 161 days.

(21) Appl. No.: 18/624,237

(22) Filed: Apr. 2, 2024

(65) Prior Publication Data

US 2025/0310353 A1     Oct. 2, 2025

Related U.S. Application Data

(60) Provisional application No. 63/609,196, filed on Dec. 12, 2023.

(51) Int. Cl.
H04L 9/40          (2022.01)
(52) U.S. Cl.
CPC ................................ H04L 63/1416 (2013.01)
(58) Field of Classification Search
CPC .................................................. H04L 63/1416
USPC .......................................................... 726/23
See application file for complete search history.

(56) References Cited

U.S. PATENT DOCUMENTS

2016/0366160 A1   12/2016   Kapoor et al.
2019/0081957 A1   3/2019   Thrash et al.

2019/0158513 A1 *   5/2019   Shtar ...................... G06F 21/552
2021/0185072 A1     6/2021   Andreu
2021/0336977 A1   10/2021   Udupi Raghavendra et al.
2022/0086178 A1 *   3/2022   Jayamohan ......... G06F 9/45558
2022/0210125 A1 *   6/2022   Moore .................... H04L 63/20
2022/0247785 A1     8/2022   Ly et al.
2022/0400123 A1   12/2022   Ayoub et al.
(Continued)

FOREIGN PATENT DOCUMENTS

CN          114024761 A       2/2022

OTHER PUBLICATIONS

International Search Report and Written Opinion for International Application No. PCT/US2024/059827, mailed Mar. 4, 2025, 12 Pages.

*Primary Examiner* — Badri Narayanan Champakesan
(74) *Attorney, Agent, or Firm* — Polsinelli P.C.

(57)          ABSTRACT

A method is described for inspecting data flows within a cloud-based gateway. The method involves receiving a data flow containing data packets at the gateway and subjecting the data packets to analysis using one or more inspection services to identify a threat signature. Upon detection of the threat signature, the method includes capturing the data packets marked with the threat signature in a temporary storage, specifically, a packet capture file within the gateway. Subsequently, the data packets bearing the detected threat signature in the temporary storage are transmitted to a persistent cloud storage. The temporary storage is purged of any remaining data packets unrelated to the threat signature, ensuring that data packets associated with the identified threat signature are preserved in the persistent cloud storage. The stored data packets are formatted in any format, including a HAR or PCAP format within the persistent cloud storage.

20 Claims, 7 Drawing Sheets

(56)         References Cited

U.S. PATENT DOCUMENTS

| | | | |
|---|---|---|---|
| 2023/0113375 A1* | 4/2023 | Thomas | H04L 63/1441 |
| | | | 726/23 |
| 2023/0188552 A1* | 6/2023 | Sern | H04L 63/1425 |
| 2023/0254338 A1* | 8/2023 | Melicher | H04L 63/1483 |
| | | | 726/13 |
| 2023/0300112 A1* | 9/2023 | Wood | H04L 63/1416 |
| | | | 726/22 |
| 2024/0039893 A1* | 2/2024 | Jia | H04L 63/1425 |
| 2024/0236142 A1* | 7/2024 | Vanveerdeghem | H04L 63/20 |

* cited by examiner

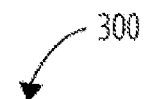
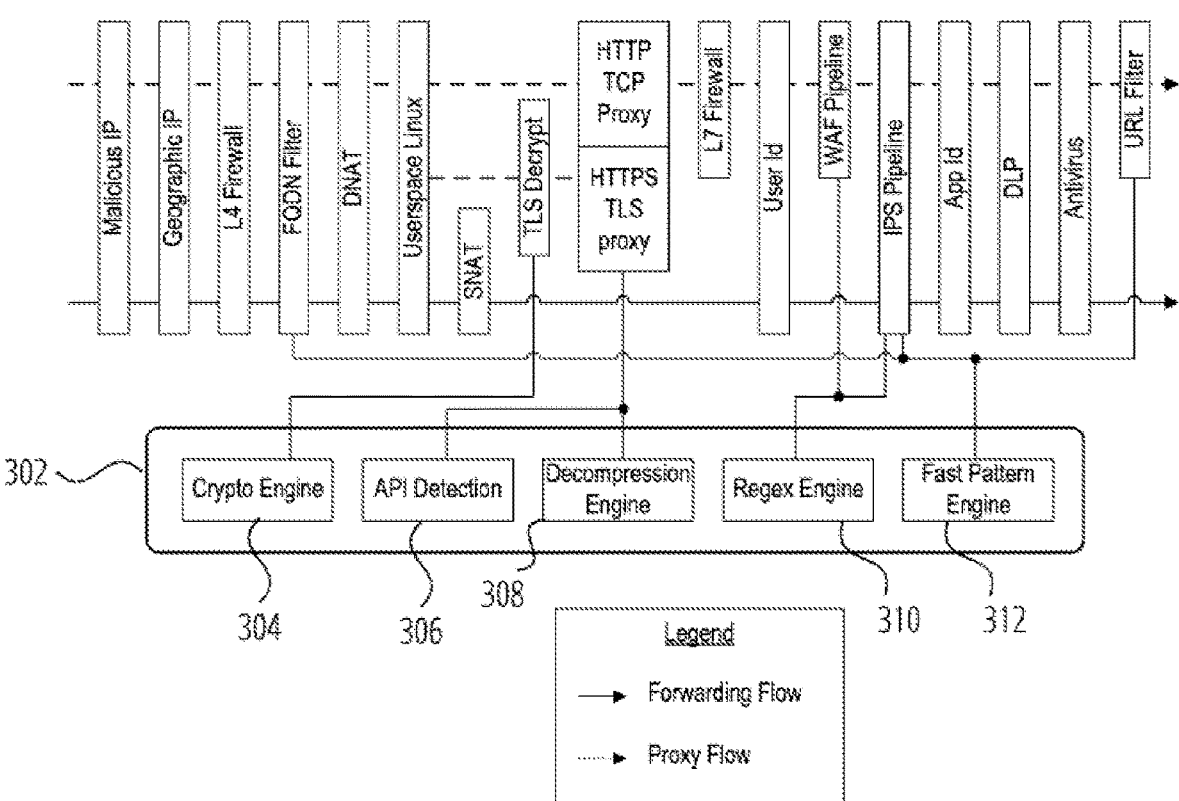
FIG. 3

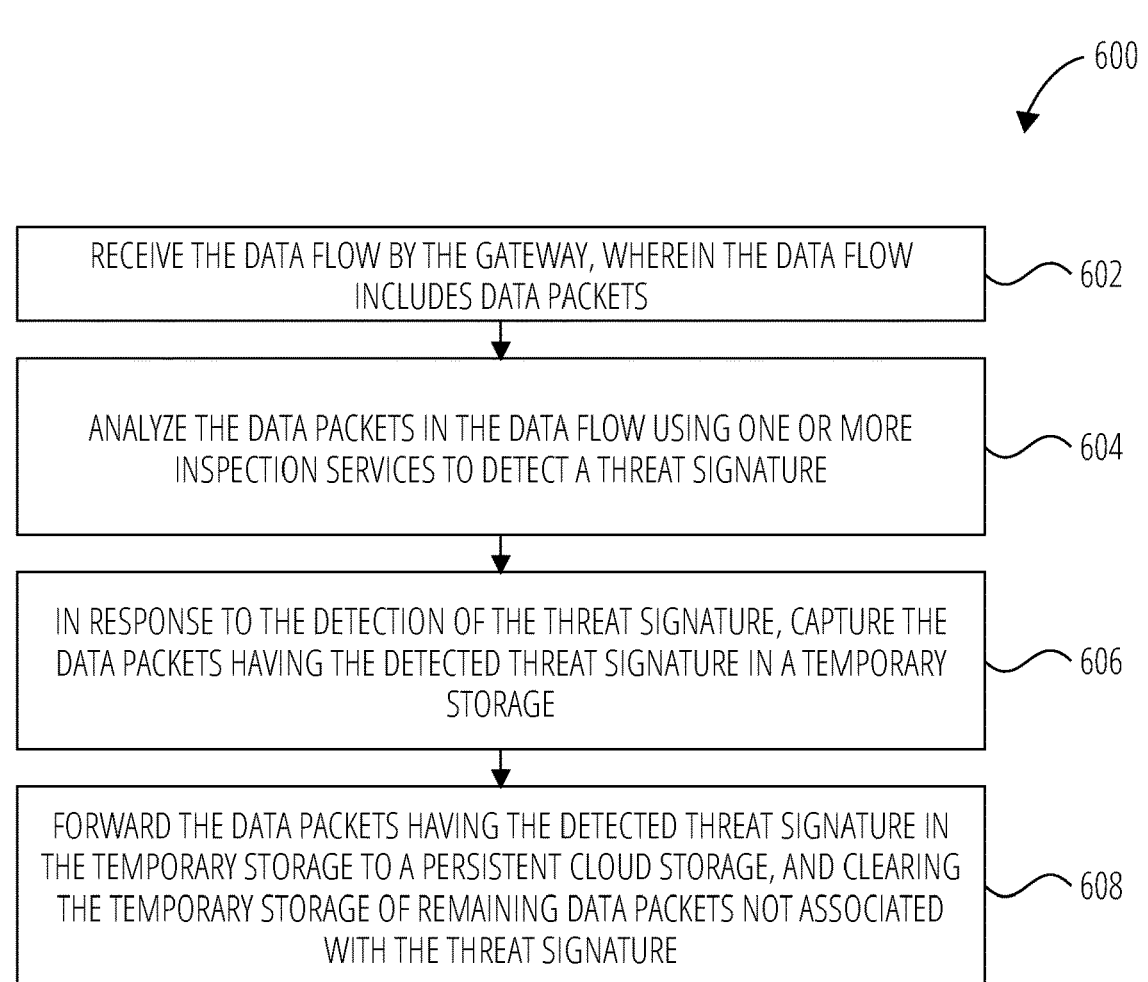

600

RECEIVE THE DATA FLOW BY THE GATEWAY, WHEREIN THE DATA FLOW INCLUDES DATA PACKETS

602

ANALYZE THE DATA PACKETS IN THE DATA FLOW USING ONE OR MORE INSPECTION SERVICES TO DETECT A THREAT SIGNATURE

604

IN RESPONSE TO THE DETECTION OF THE THREAT SIGNATURE, CAPTURE THE DATA PACKETS HAVING THE DETECTED THREAT SIGNATURE IN A TEMPORARY STORAGE

606

FORWARD THE DATA PACKETS HAVING THE DETECTED THREAT SIGNATURE IN THE TEMPORARY STORAGE TO A PERSISTENT CLOUD STORAGE, AND CLEARING THE TEMPORARY STORAGE OF REMAINING DATA PACKETS NOT ASSOCIATED WITH THE THREAT SIGNATURE

DATA UNIT CAPTURE MANAGEMENT

FIELD OF TECHNOLOGY

The present technology relates to the field of network communication, specifically addressing security services for cloud-based applications and workloads. More particularly, the proposed technology discloses methods for optimizing security services for cloud applications by selectively capturing and storing threat-related transactions.

BACKGROUND

Public clouds are third-party, off-premises cloud platforms that deliver computing resources, such as virtual machines, storage, and applications, over the internet. Services provided by public cloud providers, such as Amazon Web Services (AWS), Microsoft Azure, and Google Cloud Platform, are shared among multiple customers. Public clouds offer scalability, cost efficiency, and flexibility as organizations can access and pay for resources on a pay-as-you-go model. Pay-as-you-go is particularly beneficial for customers with fluctuating workloads and enabling enterprises to scale resources up or down based on demand. However, the shared nature of public clouds raises considerations regarding security, compliance, and data privacy, and customers need to carefully evaluate their specific requirements and choose appropriate providers.

Many customers also have private clouds, which is dedicated infrastructure that is either on-premises or hosted by a third-party. Private clouds are designed exclusively for a single customer, providing greater control over resources and data. Private clouds are suitable for entities with stringent security and compliance requirements, allowing the entities to customize and manage the infrastructure according to specific needs. Entities use private clouds to retain control over important business applications, sensitive data, or when regulatory compliance mandates demand a higher level of data governance.

Hybrid and multi-cloud approaches have become popular to adapt the benefit of public and private clouds. Hybrid clouds allow organizations to enjoy the scalability of public clouds while retaining certain workloads in a private, more controlled environment. Multi-cloud strategies involve using services from multiple public cloud providers, offering redundancy, flexibility, and the ability to choose the best-suited services for specific tasks.

BRIEF DESCRIPTION OF THE SEVERAL VIEWS OF THE DRAWINGS

Details of one or more aspects of the subject matter described in this disclosure are set forth in the accompanying drawings and the description below. However, the accompanying drawings illustrate some typical aspects of this disclosure and are therefore not to be considered limiting of its scope. Other features, aspects, and advantages will become apparent from the description, the drawings, and the claims.

FIG. 3 illustrates a functional view of a data path pipeline and integration with hardware in accordance with some examples of the disclosure.

FIG. 6 illustrates a flow chart for inspecting a data flow by a gateway in a cloud in accordance with some examples of the disclosure.

DETAILED DESCRIPTION

Figure 1:
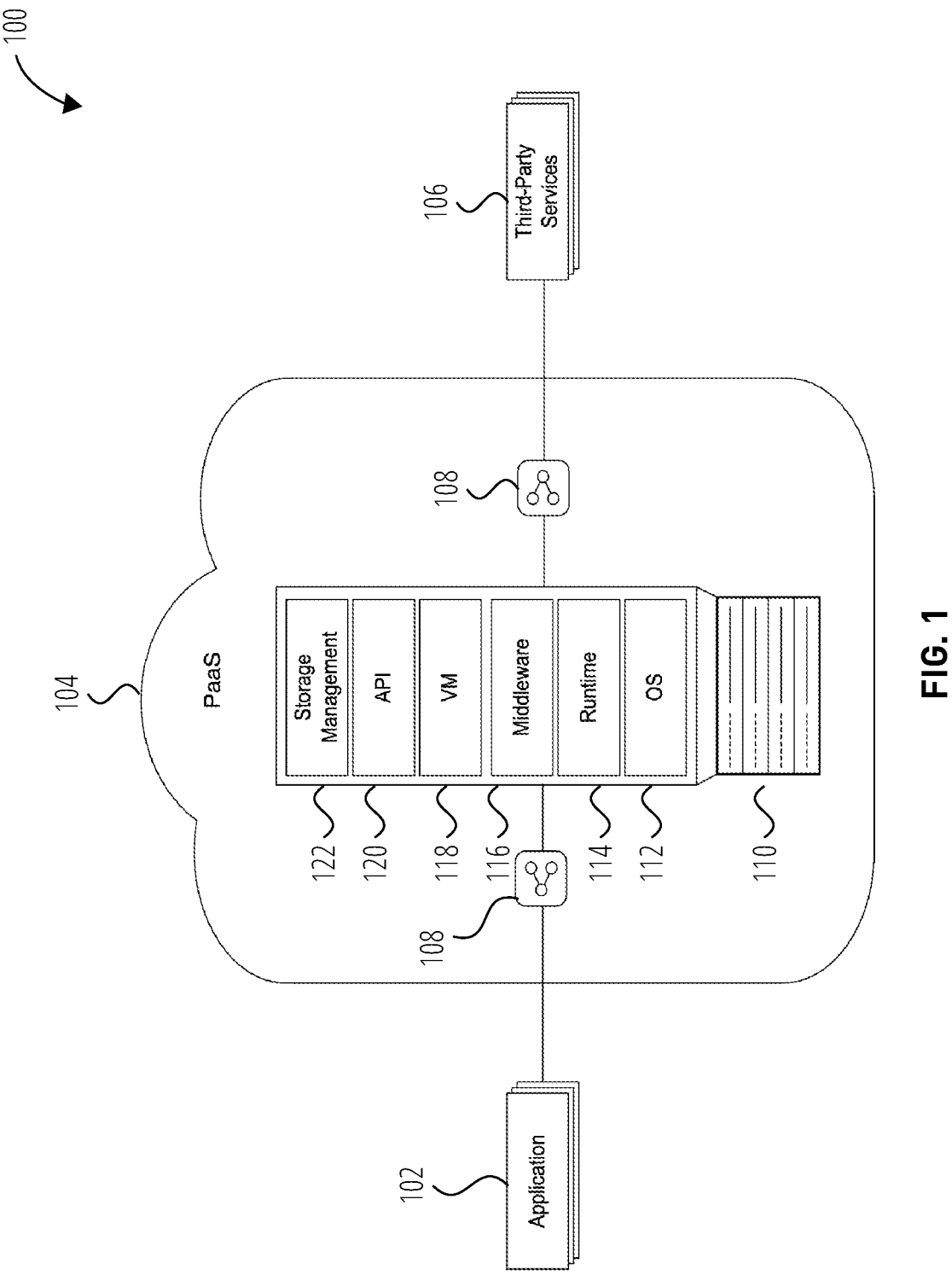
FIG. 1 is a conceptual diagram of a cloud security platform that to integrates into different cloud providers according to some examples of the disclosure.

Various embodiments of the disclosure are discussed in detail below. While specific implementations are discussed, it should be understood that this is done for illustration purposes. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure may be references to the same embodiment or any embodiment; and such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification, including examples of any terms discussed herein, is illustrative and is not intended to further limit the scope and meaning of the disclosure or of any example term. Likewise, the disclosure is not limited to various embodiments given in this specification.

Without intent to limit the scope of the disclosure, examples of instruments, apparatus, methods, and their related results according to the embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or may be learned by practice of the herein disclosed principles. The features and advantages of the disclosure may be realized and obtained by means of the instruments and combinations particularly pointed out in the appended claims. These and other features of the disclosure will become more fully apparent from the following description and appended claims or may be learned by the practice of the principles set forth herein.

Overview

The present disclosure is directed toward employing a cloud gateway functioning as a proxy for content inspection and a firewall for forwarding to discern flows associated with threats. The proposed technology records details about threat-related flows by storing the complete threat-related flow in a temporary storage. To optimize data storage, the process involves initially saving the flow in the temporary storage prior to transferring it to persistent cloud-native storage due to the substantial volume of data being stored.

In one aspect, a method for inspecting a data flow by a gateway in a cloud, the method includes receiving the data flow by the gateway, where the data flow includes data packets, analyzing the data packets in the data flow using one or more inspection services to detect a threat signature, where the data flow is analyzed in accordance with an inspection policy associated with the data flow, in response to the detection of the threat signature, capturing the data packets having the detected threat signature in a temporary storage, where the temporary storage is a packet capture file within the gateway, and forwarding the data packets having the detected threat signature in the temporary storage to a persistent cloud storage, and clearing the temporary storage of remaining data packets not associated with the threat signature, whereby data packets associated with the threat signature are stored in the persistent cloud storage, where the data packets are stored in a HTTP Archive (HAR) and a packet capture (PCAP) format in the persistent cloud storage, where the persistent cloud storage is AMAZON S3 or a binary large object (BLOB).

In some aspects, the method may also include where the gateway is configured as a proxy for a first application, the method further includes inspecting the data packets of the data flow, which is a proxy flow, according to a first policy associated with the first application for which the gateway is configured as the proxy for the first application, where the data packets make up a first transaction with the first application, where the gateway acting as the proxy performs additional inspection services on proxy flows, where when the threat signature is detected for the proxy flow saving additional context such as the transaction that triggered the flow, and information about the application.

In some aspects, the method may also include further includes identifying a second buffer that meets a predetermined data packet threshold, the second buffer includes a second set of data packets to be stored in the temporary storage, transmitting data stored in the temporary storage to the cloud storage, and forwarding the second set of data packets to the temporary storage.

In some aspects, the method may also include further includes associating the data packets triggering the threat signature with one or more malicious threats.

In some aspects, the method may also include where the data packets of the data flow are streaming to the gateway, and when the threat signature is detected the data packets are streamed to the temporary storage, which streams the data packets to the persistent storage.

In some aspects, the method may also include further includes detecting the temporary storage has met a predetermined threshold indicating the temporary storage is full, purging a portion of the data packets in the temporary storage to avoid creating a bottleneck in a threat detection pipeline, where the portion of the data packets includes the detected threat signature, and storing the purged portion of the data packets in the persistent cloud storage.

In some aspects, the method may also include further includes monitoring the central processing unit (CPU) cycles consumed by the gateway, determining that the CPU cycles consumed have reached a threshold to trigger a need to scale capacity of the gateway, scaling the gateway by creating a second gateway instance based on the determination that the CPU cycles consumed have reached a threshold to trigger a need to scale the capacity of the gateway, wherein the flows are getting sprayed to multiple gateway instances in a pool of gateways, in a cluster, we can actually account for the additional amount of CPU cycles this, this entails and actually feed that into our auto-scaling algorithms.

In one aspect, a gateway in a cloud includes a transceiver. The cloud also includes a processor configured to execute instructions and cause the processor to receive the data flow, where the data flow includes data packets, analyze the data packets in the data flow using one or more inspection services to detect a threat signature, where the data flow is analyzed in accordance with an inspection policy associated with the data flow, in response to the detection of the threat signature, capture the data packets having the detected threat signature in a temporary storage, where the temporary storage is a packet capture file within the gateway, and forward the data packets having the detected threat signature in the temporary storage to a persistent cloud storage, and clearing the temporary storage of remaining data packets not associated with the threat signature, whereby data packets associated with the threat signature are stored in the persistent cloud storage, where the data packets are stored in any format, including a HAR and PCAP format in the persistent cloud storage, where the persistent cloud storage is AMAZON S3 or a binary large object (BLOB).

In one aspect, a non-transitory computer-readable storage medium includes instructions, the instructions, when executed by a computing system, cause the computing system to receive the data flow by the gateway, where the data flow includes data packets, analyze the data packets in the data flow using one or more inspection services to detect a threat signature, where the data flow is analyzed in accordance with an inspection policy associated with the data flow, in response to the detection of the threat signature, capture the data packets having the detected threat signature in a temporary storage, where the temporary storage is a packet capture file within the gateway, and forward the data packets having the detected threat signature in the temporary storage to a persistent cloud storage, and clearing the temporary storage of remaining data packets not associated with the threat signature, whereby data packets associated with the threat signature are stored in the persistent cloud storage, where the data packets are stored in any format including a HAR and a PCAP format in the persistent cloud storage, where the persistent cloud storage is AMAZON S3 or a binary large object (BLOB).

The following description is directed to certain implementations for the purposes of describing innovative aspects of this disclosure. However, a person having ordinary skill in the art will readily recognize that the teachings herein can be applied in a multitude of different ways. The described implementations can be implemented in any device, system or network that is capable of transmitting and receiving radio frequency (RF) signals according to one or more of the Institute of Electrical and Electronics Engineers (IEEE) 802.11 standards, the IEEE 802.15 standards, the Bluetooth® standards as defined by the Bluetooth Special Interest Group (SIG), or the Long Term Evolution (LTE), 3G, 4G or 5G (New Radio (NR)) standards promulgated by the 3rd Generation Partnership Project (3GPP), among others. The described implementations can be implemented in any device, system or network that is capable of transmitting and receiving RF signals according to one or more of the following technologies or techniques: code division multiple access (CDMA), time division multiple access (TDMA), frequency division multiple access (FDMA), orthogonal FDMA (OFDMA), single-carrier FDMA (SC-FDMA), single-user (SU) multiple-input multiple-output (MIMO) and multi-user (MU) MIMO. The described implementations also can be implemented using other wireless communication protocols or RF signals suitable for use in one or more of a wireless personal area network (WPAN), a wireless local area network (WLAN), a wireless wide area network (WWAN), or an internet of things (IOT) network.

DESCRIPTION OF EXAMPLE EMBODIMENTS

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims or can be learned by the practice of the principles set forth herein.

The following description is directed to certain implementations for the purposes of describing innovative aspects of this disclosure. However, a person having ordinary skill in the art will readily recognize that the teachings herein can be applied in a multitude of different ways. The described implementations can be implemented in any device, system or network that is capable of transmitting and receiving radio frequency (RF) signals according to one or more of the Institute of Electrical and Electronics Engineers (IEEE) 802.11 standards, the IEEE 802.15 standards, the Bluetooth® standards as defined by the Bluetooth Special Interest Group (SIG), or the Long Term Evolution (LTE), 3G, 4G or 5G (New Radio (NR)) standards promulgated by the 3rd Generation Partnership Project (3GPP), among others. The described implementations can be implemented in any device, system or network that is capable of transmitting and receiving RF signals according to one or more of the following technologies or techniques: code division multiple access (CDMA), time division multiple access (TDMA), frequency division multiple access (FDMA), orthogonal FDMA (OFDMA), single-carrier FDMA (SC-FDMA), single-user (SU) multiple-input multiple-output (MIMO) and multi-user (MU) MIMO. The described implementations also can be implemented using other wireless communication protocols or RF signals suitable for use in one or more of a wireless personal area network (WPAN), a wireless local area network (WLAN), a wireless wide area network (WWAN), or an internet of things (IOT) network.

Cloud network providers include various companies such as Google, Apple, Amazon, Microsoft, DigitalOcean, Vercel, Alibaba, Netlify, Redhat OpenShift, Oracle, and many other entities. Each cloud provider offers a range of services, from foundational infrastructure, which is referred to Infrastructure as a Service (IaaS), platforms for application development and deployment, which is referred to as platform as a service (PaaS), and fully managed software applications, which is referred to as software as a service (SaaS). Cloud providers maintain a network of geographically distributed data centers that host servers, storage, and networking equipment and allowing customers to deploy resources in proximity to their target audience for improved performance and redundancy, including content delivery networks (CDN) and edge compute services.

Virtualization technology is a foundational aspect of cloud providers and enable the creation of virtual instances of servers, storage, and network resources within a geographic region. Cloud providers also deploy resource orchestration tools manage the dynamic allocation and scaling of these virtual resources based on demand. Fundamentally, cloud providers establish robust, high-speed connections between their data centers and forming a global network backbone. This backbone ensures low-latency communication and facilitates data transfer between different regions.

Conventional security within cloud providers deploys a range of security measures, including encryption, firewalls, identity and access management, and compliance certifications, to safeguard customer data and ensure the integrity of their services. Cloud services are designed to be elastic, allowing customers to dynamically scale resources up or down based on demand to handle varying workloads efficiently.

Cloud providers offer various managed services, such as databases, machine learning, and analytics, runtimes, and other aspects that allow customers to leverage advanced functionalities without the need for deep expertise in those domains. Various application programming interfaces (APIs) can be exposed by a cloud provider that enable users to programmatically interact with, manage their resources, and allow integration with third-party tools and the automation of various tasks.

Fundamentally, in past server architectures, a server was defined with a fixed internet protocol (IP) address. In cloud-based computing, IP addresses are dynamic and enable the resources within the cloud providers. In cloud environments, dynamic scaling is important to accommodate varying workloads. Dynamic IP addresses enable automatic allocation and release of addresses as resources are provisioned or de-provisioned. The dynamic addresses also allow service elasticity to respond to increasing or decreasing resources, cost efficiently, automation and orchestration of tools within the cloud integration and deployment environment, load balancing, high availability and failover, adaptable network topology, and increase resource utilization.

Cloud security is a fundamental issue as customers typically may deploy resources and integrate into resources of different cloud providers. While the clouds have a generic infrastructure configuration with a spine network topology that routes traffic to a top-of-rack (TOR) switch and servers within the racks, clouds are still configured differently and have different requirements. For example, some cloud providers are emphasizing different geographical markets, cloud providers can emphasize different business segments (e.g., healthcare, government, etc.), and configure services according to their intended market.

Cloud security has become an important aspect of networking today because there are significant challenges. For example, data breaches are a significant concern in the cloud because unauthorized access to sensitive data, either through misconfigurations or cyberattacks, can lead to data exposure, and compromise the confidentiality of information. Misconfigurations of cloud services, such as incorrectly configured access controls or insecure storage settings, can create vulnerabilities and may expose data to unauthorized users or attackers.

Another important aspect of cloud security is identity management. Improper management of user identities and access privileges can result in unauthorized access. Inadequate or improperly implemented encryption can lead to data exposure. This includes data in transit, data at rest, and data during processing. Ensuring end-to-end encryption is crucial for maintaining data confidentiality.

Cloud providers use shared infrastructure and technologies. If a vulnerability is discovered in a shared component, multiple clients could be affected simultaneously. Regular security updates and patches are essential to mitigate this risk, and there is an increased market for third-party services that integrate into cloud provider services.

Organizations may fail to conduct thorough due diligence when selecting a cloud service provider. Inadequate assessment of a provider's security measures, compliance standards, and data protection practices can result in security gaps.

The evolving landscape of cybersecurity introduces new threats and attack vectors. Cloud security solutions continuously adapt to address emerging threats, such as zero-day vulnerabilities and advanced persistent threats (APTs). These attacks can come from many different sources, and monitoring these threats can be too difficult for entities.

The cloud is dynamic, connected and encrypted. Customers of cloud providers primarily care about their business operations and not the infrastructure behind the business operations. In the current environment, customers of cloud service providers need to implement instruction protection services (IPS), instruction detection services (IDS), web application firewalls (WAFs), as well as provide egress security. Customers may also need to implement data lost prevention services (DLP) to comply with sensitive information requirements.

The proposed technology addresses the evolution of cybersecurity services, originally designed for safeguarding on-premises networks. As enterprises transitioned to public clouds, these services were modified to accommodate the changing network dynamics. However, this shift inadvertently led to sub-optimal security offerings for cloud-based applications and workloads not inherently designed for the cloud environment. The challenge arises from the inadequacy of traditional security solutions to effectively address the unique requirements and intricacies of cloud-native architectures.

In the realm of conventional systems, especially on-premises firewalls, a significant challenge exists in the amount of data logged for each network flow. This challenge stems from a historical emphasis on conserving storage space. Consequently, the constrained storage capacity poses challenges for comprehensive data retention, impeding the ability to capture and analyze a broader set of information related to network activities. This challenge underscores the necessity for innovative and cloud-native security solutions capable of adapting to the dynamic nature of contemporary cloud environments. The concerns regarding on-premises firewalls writing a limited amount of information about every flow into a data log emphasize the need for advanced solutions to overcome these challenges and provide robust security in cloud-native architectures.

The constrained data logging capacity at a gateway equipped with a firewall presents inherent risks in addressing security threats effectively. In scenarios where a gateway manages a multitude of data flows, the limited storage space hinders the retention of crucial information pertaining to security threats detected by the firewall. This hinderance exposes the gateway and the applications it serves to potential vulnerabilities, as the insufficient data logging capability inhibits the comprehensive analysis and documentation of security incidents.

Consider a situation where the gateway encounters a surge in network activity, characterized by diverse data flows originating from various sources. The firewall at the gateway diligently identifies potential security threats within these flows. However, due to the restricted data logging capacity, the gateway is unable to store detailed information about each detected threat. Consequently, crucial insights into the nature and patterns of these security threats may be lost, impeding the ability to conduct thorough post-incident analysis.

The ramifications of this hinderance become pronounced when facing sophisticated and evolving security threats. Malicious actors may exploit the gaps in data logging, taking advantage of the gateway's inability to retain comprehensive information. Without a detailed record of security incidents, the gateway may struggle to implement timely and targeted remediation measures. This deficiency in information retention not only compromises the gateway's ability to thwart immediate threats but also hampers its capacity to adapt and fortify against emerging security challenges.

Thus, the restricted data logging capability at the gateway's firewall introduces risks that stem from the inability to capture and analyze security threats within a dynamic network environment. As such, there is a need to address the problems of current gateway systems. The proposed solution is directed towards methods for implementing advanced security solutions with improved data retention capabilities to strengthen the resilience of gateways, to help protect applications from evolving and sophisticated cyber threats.

The proposed technology introduces a cloud gateway designed to operate seamlessly as a dual-function entity, serving both as a proxy for content inspection and a forwarding firewall with packet-by-packet examination capability. This approach enables the gateway to enhance its discernment of potentially malicious elements within data flows. By analyzing packets on a granular level, the gateway gains an understanding of the content, facilitating more accurate determinations regarding the presence of malicious attributes.

The dual functionality of the gateway allows it to make informed decisions about the nature of the data flow it encounters. By combining content inspection and forwarding firewall capabilities, the gateway ensures a thorough evaluation of each packet, contributing to a nuanced assessment of the overall flow. This approach empowers the gateway to efficiently differentiate between benign and potentially harmful elements, laying the foundation for robust threat detection mechanisms.

Furthermore, the gateway's ability to scrutinize data flows on a packet-by-packet basis enables it to optimize the identification of malicious content. In instances where a threat signature is detected within the flow, the gateway takes a proactive stance by preserving the entire potentially malicious flow. This strategic approach ensures that all relevant information related to the identified threat is retained, providing a comprehensive record for further analysis, reference, and potential security measures.

In essence, the disclosed technology not only introduces a cloud gateway with dual functionality but also emphasizes a meticulous, packet-level inspection approach that significantly improves the gateway's capacity to identify and respond to security threats effectively. This nuanced analysis, coupled with the capability to capture, and store entire potentially malicious flows, positions the gateway as a robust and adaptive component in addressing the evolving landscape of cybersecurity challenges in modern network environments.

FIG. 1 is a conceptual diagram of a networking environment 100 associated with a cloud security platform that integrates into different cloud providers according to some aspects of the disclosure. In some aspects, the networking environment 100 includes a plurality of applications 102 that connected to a cloud security platform 104 that is configured for various aspects of cloud security. The cloud security platform 104 comprises a compute layer that is configured to discover applications and network resources, deploy cloud-based firewalls and management, and provide multi-cloud policy and control from a single end point.

The applications 102 include various forms, such as distributed cloud-based applications, edge-based applications (e.g., webapps), desktop-based applications, mobile phone applications, and so forth. The third-party services 106 include various services, such as cloud service providers and other services that are integrated into the cloud security platform 104. For example, the cloud security platform 104 may be configured to use different services for specialty functions that are consistent for each customer of the 104. Non-limiting examples of a different services include various types of communication services (e.g., mail servers, communication platforms, etc.), security-oriented services (e.g., monitoring services such as Splunk), search services, storage services (e.g., relational databases, document databases, time-series databases, graph databases, etc.), authentication services, and so forth.

The cloud security platform 104 is configured to be deployed within various infrastructure environments in a PaaS manner. The cloud security platform 104 includes networking infrastructure 108 for connecting the application 102 to the cloud security platform 104. The cloud security platform 104 includes a plurality of servers 110 that are geographically distributed, with each server being managed by with various operating system(s) (OS) 112, runtime(s) 114, middleware 116, virtual machine(s) (VM) 118, API(s) 120, and storage management 122 service(s). In some aspects, the cloud security platform 104 includes a runtime 114 refers to the environment that the middleware 116 will execute within to control various aspects of the cloud security platform 104. For example, VM(s) 118 may be Kubernetes containers, and middleware 116 may be configured to add or remove hardware resources dynamically within cloud providers.

The cloud security platform 104 also exposes one or more APIs 120 for allowing the applications 102 to interact with the cloud security platform 104. The API(s) 120 enable a customer to surface information, interact with information within the cloud security platform 104, and perform other low-level functions to supplement security services of the cloud security platform 104. The API 120 is also configured to integrate with other, third-party services (e.g., the third-party service 106) to perform various function. For example, the API 120 may access a customer's resources in a cloud service provider (e.g., a third-party service 106) to monitor for threats, analyze configurations, retrieve logs, monitor communications, and so forth. In one aspect, the API 120 is integrating with third-party cloud providers in an agnostic manner and allows the cloud security platform 104 to perform functions dynamically cross cloud providers. For example, the API 120 may dynamically scale resources, allow resources to join a cluster (e.g., a cluster of controller instances), implement security rules from the cloud security platform 104 into the corresponding cloud provider, and other functions that enable a cloud agnostic and service agnostic integrated platform. For example, in some cases, the API 120 is configured to integrate with other security services to retrieve alerts pertaining to specific assets to reduce exposure to malicious actors.

The cloud security platform 104 also includes management services 122 for managing various resources of a customer. In some aspects, the management services 122 can manage resources including a controller (e.g., the controller 210 in FIG. 2), data resources (e.g., a data plane 270 in FIG. 2), and various integrations (e.g., a gateway 250, third-party services 252, cloud providers 254 in FIG. 2). For example, the management services 122 may allow the customer to manage various third-party resources such as a cloud-based relational database, a cloud-based document database, a cloud-based storage service (e.g., various implementations of the S3 API) and so forth.

In one aspect, the storage management 122 includes an onboarding user experience that connects to various cloud providers (e.g., using the API 120) and allows onboarding of different cloud resources. The storage management 122 also provides a cloud-agnostic approach to managing resources across different cloud providers, such as scaling up identical resources in different regions using different cloud providers. As an example, some cloud providers do not have a significant presence in the far east, and the storage management 122 is configured to activate similar resources in a first geographical region (e.g., in Europe) and a second geographical region (e.g., Asia) with similar configurations in different cloud providers.

The cloud security platform 104 is configured to provide security across and within cloud providers in different contexts. For example, the cloud security platform 104 provides protection and security mechanisms in different flows. The cloud security platform 104 is configured to provide varying levels of protection based on flow, packet, encryption, and other mechanisms. In one aspect, the cloud security platform 104 is configured to protect forwarding flows and packet flows.

Forwarding flow refers to the set of rules and decisions that determine how network devices handle incoming packets without inspecting packet and traffic contents. A forwarding flow involves making decisions based on information such as destination IP address, media access control (MAC) address, and routing tables to determine the outgoing interface for the packet and typically includes actions like address resolution (e.g., address resolution protocol (ARP) for IP to MAC address mapping), updating MAC tables, and forwarding the packet to the appropriate interface, and various rules to apply based on configuration and policies.

A proxy flow comprises both forward proxy and reverse proxy function and inspects content of encrypted flow and access control. In some aspects, the cloud security platform 104 decrypts encrypted traffic to ensure malicious actors are not exploiting vulnerabilities in TLS-encrypted applications, and prevents data exfiltration (e.g., DLP) or connection to inappropriate uniform resource locators (URLs).

The cloud security platform 104 is also configured to handle packets differently based on security, such as policies related to IPS and a web application firewall (WAF). WAF protects various web application from online threats, such as structured query language (SQL) injection, cross-site scripting (XSS), authentication spoofing, and other potential security. For example, a WAF filters and monitors traffic by inspecting headers (e.g., a JavaScript Object Notation (JSON) encoded object in a Hypertext Transfer Protocol (HTTP) header).

The cloud security platform 104 provides real-time discovery of multi-cloud workloads, at-scale, for virtual private clouds (VPCs) and cloud accounts. Real-time discovery also enables finding security gaps and improve defensive posture. The cloud security platform 104 also provides a data plane management using gateways (e.g., the gateway 250 in FIG. 2) that provides self-healing via in-band/transparent diagnostics), seamless upgrade (e.g., no downtime or user intervention), and auto scaling. The cloud security platform 104 may implement a containerized service (e.g., Kubernetes) to enable scale out deployments with a high service level agreement (SLA) without having to maintain network security infrastructure and integrate with cloud-native networking to enable automation of distributed and centralized (hub-n-spoke) architectures for ingress, egress, east-west (including micro-segmentation) and hybrid cloud configurations. The cloud security platform 104 maintains traffic within cloud account boundaries and customers retain control of their private encryption keys without needing to share encryption keys with the control plane (e.g., the controller 210 of FIG. 2).

Figure 2:
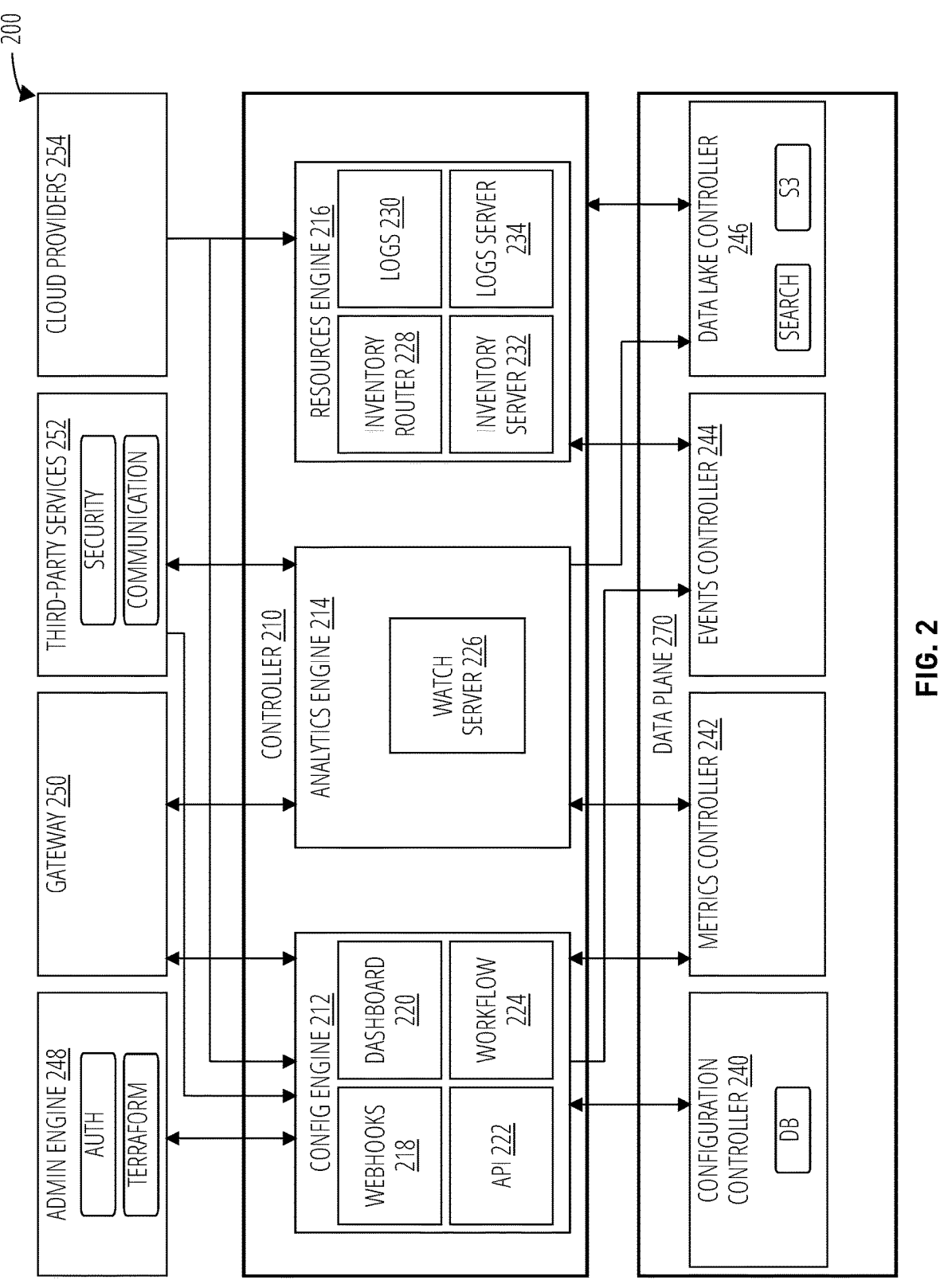
FIG. 2 is a conceptual diagram of a controller of a cloud security platform that integrates into different cloud service providers in accordance with some examples of the disclosure.

FIG. 2 is a conceptual diagram of a cloud security platform that integrates into different cloud service providers in accordance with some aspects of the disclosure.

In some aspects, the cloud security platform 200 separates compute and data storage functions and enables a multitenancy to support different customers while maintaining data separation when needed. For example, the compute components are separated into a controller 210 and data storage components are implemented in a data plane 270. The controller 210 may be a collection of Kubernetes-based services that deploy a low latency connection (e.g., gRPC) to connect various endpoints and enable bidirectional streaming, preventing connection setup and teardown. Each service within the controller 210 scales up or down horizontally based on load.

The controller 210 includes a configuration (config) engine 212, an analytics engine 214, and a resources engine 216. The configuration engine 212 configures the various components and provides various services such as webhooks 218, a dashboard 220, an API 222, and a workflow 224.

In one aspect, the webhooks 218 module is configures asynchronous method of communication between different applications or services in real-time. In a webhook configuration, one application can register an endpoint URL with another, specifying where it should send data when a particular event occurs. When the event triggers, the originating system automatically pushes data to the registered URL, allowing the receiving application to process and act upon the information immediately. In some aspects, the webhooks 218 modules implements to an observer pattern, with a dependent component providing a URL to the observed data source.

The dashboard 220 provides a user experience to a customer of the cloud security platform 104 and provides various integration modules, onboarding platforms, monitoring tools, and other functions for customers to access.

In some aspects, the APIs 222 can be various libraries to interact with various services, either through a dashboard 220 interface, a command line interface (not shown), or other tooling (not shown). The APIs 222 can also be API endpoints of the cloud security platform 104 or an API library associated with a third-party service (e.g., third-party services 252), or APIs associated with the cloud providers 254. In one aspect, the APIs 222 can include an agnostic API library that is configured to interact with the cloud providers 254 using a single API interface to scale resources, responds to security incidents, or other functions. This API 222 can be accessed via a command line interface or may be distributed to customers via various package management services.

The workflow 224 module can be various components that enable a customer to perform various tasks, such as manage specific resources, deploy services, communicate with team members regarding issues, and so forth. For example, the workflow 224 module can interact with the gateways 250 and an administration (admin) engine 248 to manage resources, access to resources, and deployment of various resources (e.g., deploy infrastructure with Terraform).

The analytics engine 214 is configured to integrate with gateways 250 and various third-party services 252 to monitor various events, services, and other operations. The 214 includes a watch server 226 that is configured to disambiguate information from multiple sources of information (e.g., the gateway 250, the third-party services 252, etc.) to provide a wholistic view of cloud networking operations. The analytics engine 214 may also be configured to interact with various components of the data plane 270 such as a metrics controller 242 and a data lake controller 246.

In some aspects, the resources engine 216 receives resources from cloud providers 254 and includes various components to route information and store information. The resources engine 216 includes an inventory router 228, logs 230 (e.g., a cache of logs for various function), an inventory server 232, and a logs server 234. The components of the resources engine 216 are configured to disambiguate and combine information in agnostic and standardized manner and store various resources in the data plane 270. For example, the resources engine 216 stores and receives events from an events controller 244 and also sores and receives logs in the data lake controller 246. In some aspects, the inventory router 228 and the inventory server 232 build an evergreen model of the customer's cloud accounts and subscriptions and create an address object for security policy management for the cloud security platform 200. The address object represents a segment of the customer's subscription based on cloud native attributes (e.g., Security Group, ASG, customer-defined tags) and maps to a collection of IP Addresses which is automatically refreshed and synchronized with the gateway 250.

The data plane 270 includes various components to separate various types of information associated with the control plane and interconnected third-party services 252 and cloud providers 254. For example, the data plane 270 includes a configuration controller 240 that stores inventory information of a customer and various configuration information. In one example, the cloud providers 254 use different metrics for decisions pertaining to scaling deployed resources, and the configuration controller 240 stores information that allows the controller 210 to scale resources within the cloud providers 254 in a standardized manner. In some aspects, the configuration controller 240 may include storage mechanisms such as a relational database, a document database, and other high availability storage mediums. The storage mechanisms can be on-premises resources or off-premises or cloud-based solutions such as various cloud-based relational or document databases (e.g., Redis, MySQL, MongoDB, etc.).

The data plane 270 also includes a metrics controller 242 that is configured to interact with custom metrics data or a third-party service for metrics analysis (e.g., Amazon Cloud-Watch). The events controller 244 is configured to handle and store events and various queues. For example, the events controller can include a Kafka server for handling real-time data feeds and event-driven applications. The metrics controller 242 may use a publish-subscribe model in which producers (e.g., a third-party service, an internal component of the controller 210, a gateway 250, etc.) publish data streams and a consumer subscribes to receive and process these streams in a fault-tolerant and distributed manner. The metrics controller 242 may handle massive amounts of data with low latency and high throughput.

The data lake controller 246 provides a long-term and scalable storage mechanism and associated services. For example, the data lake controller 246 may include a cloud-based S3 API for storing to various cloud services (e.g., AWS, DigitalOcean, OpenShift) or on-premises services (e.g., MinIO, etc.). The data lake controller 246 may also include a search-based mechanism such as ElasticSearch for large-scale and efficient search of contents within the non-volatile cloud storage mechanisms. In some aspects, the data lake controller 246 stores network logs and implement search functionality (e.g., Snowflake) for large scale ad hoc queries for security research and analysis.

The cloud security platform 200 also includes an administration engine 248, a gateway 250, and integrations into various third-party services 106. The administration engine 248 may include authentication services (e.g., Auth0, Okta) to verify identity and provide authentication mechanisms (e.g., access tokens), and may include infrastructure as code (IaC) tools such as Terraform to automate the process of creating, updating, and managing the specified infrastructure across various cloud providers or on-premises environments.

The cloud security platform 200 includes gateways 250 that are deployed into various integration points, such as cloud providers. The gateways 250 an ingress and egress points of the cloud security platform 200 and are configured to monitor traffic, provide information to the controller 210, dynamically scale based on the cloud security platform 200, and provide security to a customer's cloud infrastructure. For example, the gateways 250 may implement a transparent forward and reverse proxy to manage traffic. The gateways 250 may also include a cloud-based firewall that is configured to filter malicious traffic using various dynamic detection policies.

The cloud security platform 200 also integrates into various third-party services 252 for various purposes such as receiving threat-related intelligence (e.g., Spunk, Talos, etc.). The third-party services 252 also include different types of infrastructure components such as managing mobile devices, implementing cloud-based multimedia communication services, business analytics, network analytics (e.g., reverse address lookup), certificate services, security information and event management (SIEM), and so forth.

FIG. 3 illustrates a block diagram of a data path pipeline 300 and integration with hardware in accordance with some aspects of the disclosure.

In some aspects, the data path pipeline 300 comprises a single pass firewall architecture that uses a single pass flow without expensive context switches and memory copy operations. In a single pass flow, processing is never duplicated multiple times on a packet. For example, TCP/IP receive, and transmission operations are performed a single time. This is different than existing next generation firewalls (NGFW). The data path pipeline 300 uses fibers with flexible stages completely running in user-space, with no penalty for kernel-user context switches, which are expensive in high bandwidth and low latency operations. The data path pipeline 300 provides advanced web traffic inspection comparable to WAFs to secure all traffic flows and break the attack kill chain in multiple places, raising the economic costs for attackers. The data path pipeline 300 also captures packets of live attacks into a cloud storage bucket without significant performance degradation and enables a rule-based capture on a per-session and attack basis.

The data path pipeline 400 is also configured to be flexible and stages of processing are determined on a per-flow basis. For example, application 1 to application 2 may implement an L4 firewall and IPS inspection, application 3 to application 4 ma implement an L4 firewall, a TLS proxy, and IPS, and an internet client to web application 5 implements an L4 firewall, TLS proxy, IPS, and WAF.

In some aspects, the data path pipeline 300 includes various filters (e.g., malicious IP filter), geographic IP filter, Fully Qualified Domain Name (FQDN) filter) to filter both forwarding flows and proxy flows, as well as an L4 firewall to restrict traffic based on conventional techniques.

The data path pipeline 300 may also integrated with a hardware offload 302 (e.g., a Field-Programmable Gate Array (FPGA) of a cloud provider, an Application-Specific Integrated Circuit (ASIC), etc.) that includes additional functionality that does not impact throughput. In one aspect, a cloud providers may offer a hardware offload or an accelerator function to implement specialized function. For example, the hardware offload 302 includes a cryptographic (crypto) engine 304, an API detection 306, a decompression engine 308, a regex engine 310, and a fast pattern engine 312 to offload operations into hardware.

In one aspect, the data path pipeline 300 includes high throughput decryption and re-encryption to enable inspection of all encrypted flows using the cryptographic engine 304. By contrast, traditional NGFWs provide a throughput of around 10% for inspecting encrypted flows. The data path pipeline 300 may use a decompression engine 308 to decrypt compressed traffic and perform deep packet inspection. For example, the data path pipeline 300 also uses a user space Linux TCP/IP driver, in addition with network address translation (NAT) in conjunction with the API detection engine 306 and the decompression engine 308 to eliminate problematic and malicious flows.

The data path pipeline 300 includes a transparent reverse and forward proxy to isolate clients and servers without exposing internal details, a layer 7 firewall to rate limit and protect applications and APIs, and secure user access by looking up end-user specific identity from an identity provider (IDP) and provide zero trust network access (ZTNA). The data path pipeline 300 includes a WAF pipeline and an IPS pipeline to detect malicious and problematic flows in conjunction with a regex engine 310 and a fast pattern engine 312. For example, the WAF pipeline may implement protection for web applications, including Open Web Application Security Project (OWASP) Top 10 using core ruleset and application-specific rules for frameworks and common content management tools like personal home page (PHP), Joomla and WordPress. The data path pipeline 300 includes IDS and IPS to block known vulnerabilities and provide virtual patching until the applications can be patched with updated security fixes, application identification to block traffic based on client, server or application payload, DLP loss and filtering, URL filtering, antivirus and anti-malware features to prevent malware files from being transferred for ingress (malicious file uploads), east-west lateral attacks (moving toolkits) and egress flows (e.g., botnets).

Figure 4:
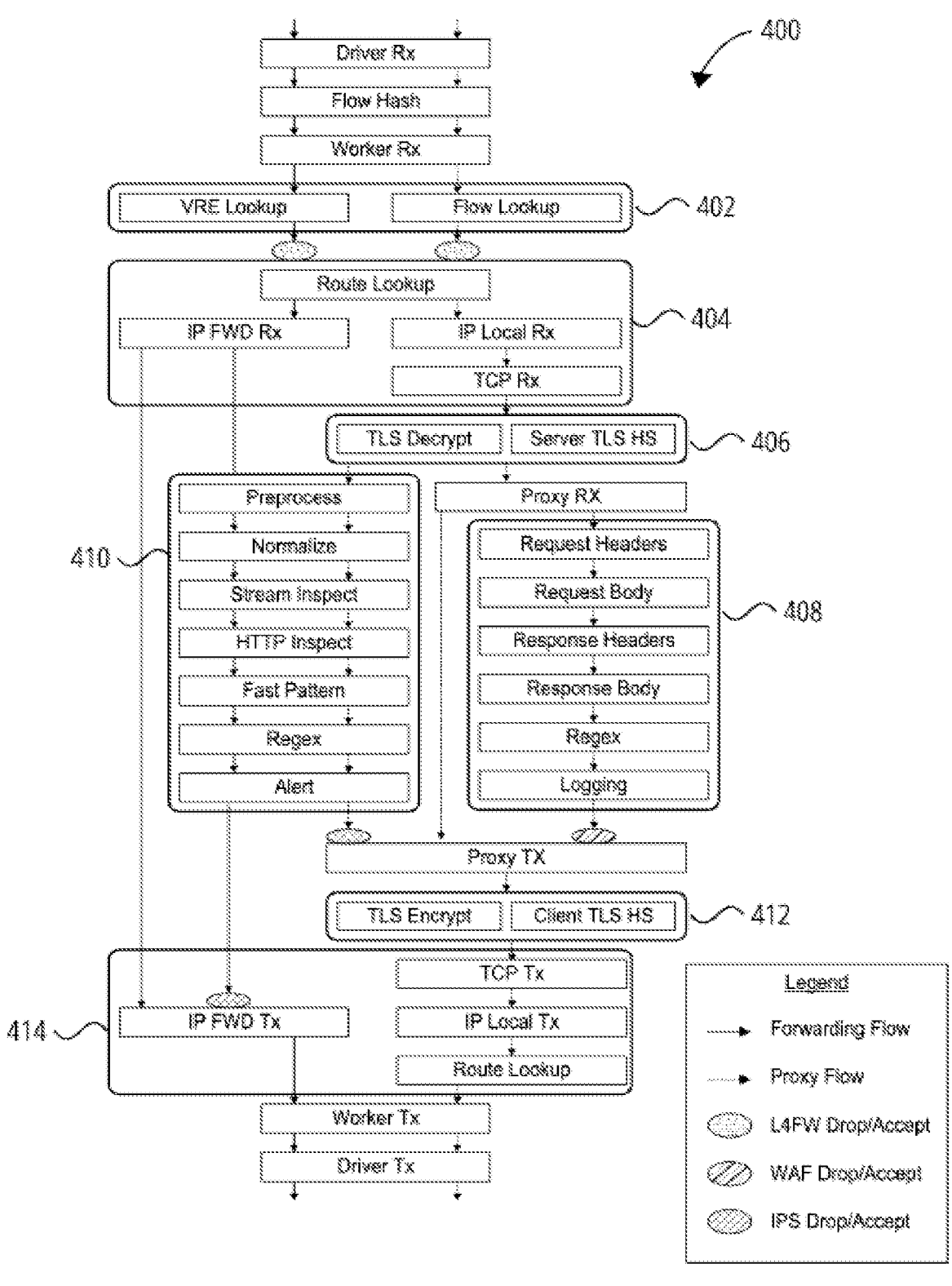
FIG. 4 illustrates a data path pipeline for forward packet flows and proxy packet flow of a cloud security platform in accordance with some examples of the disclosure.

FIG. 4 illustrates a data path pipeline 400 for forward packet flows and proxy packet flow of a cloud security platform in accordance with some aspects of the disclosure.

The data path pipeline 400 comprises a L4 firewall 402, a user space receive TCP/IP stack 404, a TLS receive proxy 406, a WAF 408, an IPS 410, a TLS transmit proxy 412, and a user space transmit TCP/IP stack 414 and illustrates the flow of forwarding flows and proxy flows, and points at which packets may be dropped/accepted using an L4 firewall, a WAF, and/or IPS.

For example, the data path pipeline 400 may be implemented as user space driver (e.g., a data path packet driver (DPDK) that receives forwarding and proxy flows, computes hashes, and provides the packet to the worker. In this case, a worker is part of a distributed instance of a gateway and provides the flows to the L4 firewall 420. For example, the L4 firewall 402, or a transport layer firewall, may be inspect traffic and filter traffic based on source and destination IP/port.

The user space receives TCP/IP stack 404 is configured to perform the receive processing of forwarding and proxy flows. For example, the user space receives TCP/IP stack 404 handles framing, addressing, and error detection within TCP/IP and further identifies per-flow processing based on policies and rules of the cloud security platform. For example, some forwarding flows are provided to the user space transmit TCP/IP stack 414, some forwarding flows are provided to the IPS 410, and proxy flows are forwarded to the TLS receive proxy 406. The TLS receive proxy 406 manages the TLS decryption process in the event further inspection is warranted based on the policies and rules, and then provides the proxy flows to either the IPS 410 or the WAF 408 based on a policy.

The IPS 410 examines its content, headers, and contextual information. Deep packet inspection involves analyzing the payload, looking for patterns, signatures, or anomalies that may indicate malicious activity. The IPS compares the packet against a database of known attack signatures and employs heuristic analysis to detect deviations from expected behavior. Additionally, it assesses factors such as source and destination addresses, ports, and protocol compliance. If the IPS identifies a packet as potentially malicious, it can take proactive measures, such as blocking the packet, alerting administrators, or initiating predefined security policies to prevent the exploitation of vulnerabilities and safeguard the network from intrusion attempts.

The WAF 408 monitors, filters, and analyzes HTTP traffic in real-time and actively look for and blocks common web vulnerabilities such as SQL injection, XSS, and other application-layer attacks. By examining and validating HTTP requests and responses, the WAF can detect and block malicious traffic, ensuring that legitimate requests reach the web application. WAFs often employ rule-based policies, signature-based detection, and behavioral analysis to identify and mitigate potential security risks.

The TLS transmit proxies 412 reassembles the proxy flows and contextual information, and provides the proxy flows the user space transmit TCP/IP stack 414, which reassembles the packet and forwards any traffic. As shown in FIG. 4, flows can be dropped at different points identified in the user space receive TCP/IP stack 404, after the WAF 408 or the IPS 410, or in the user space receive user space transmit TCP/IP stack 414.

Figure 5:
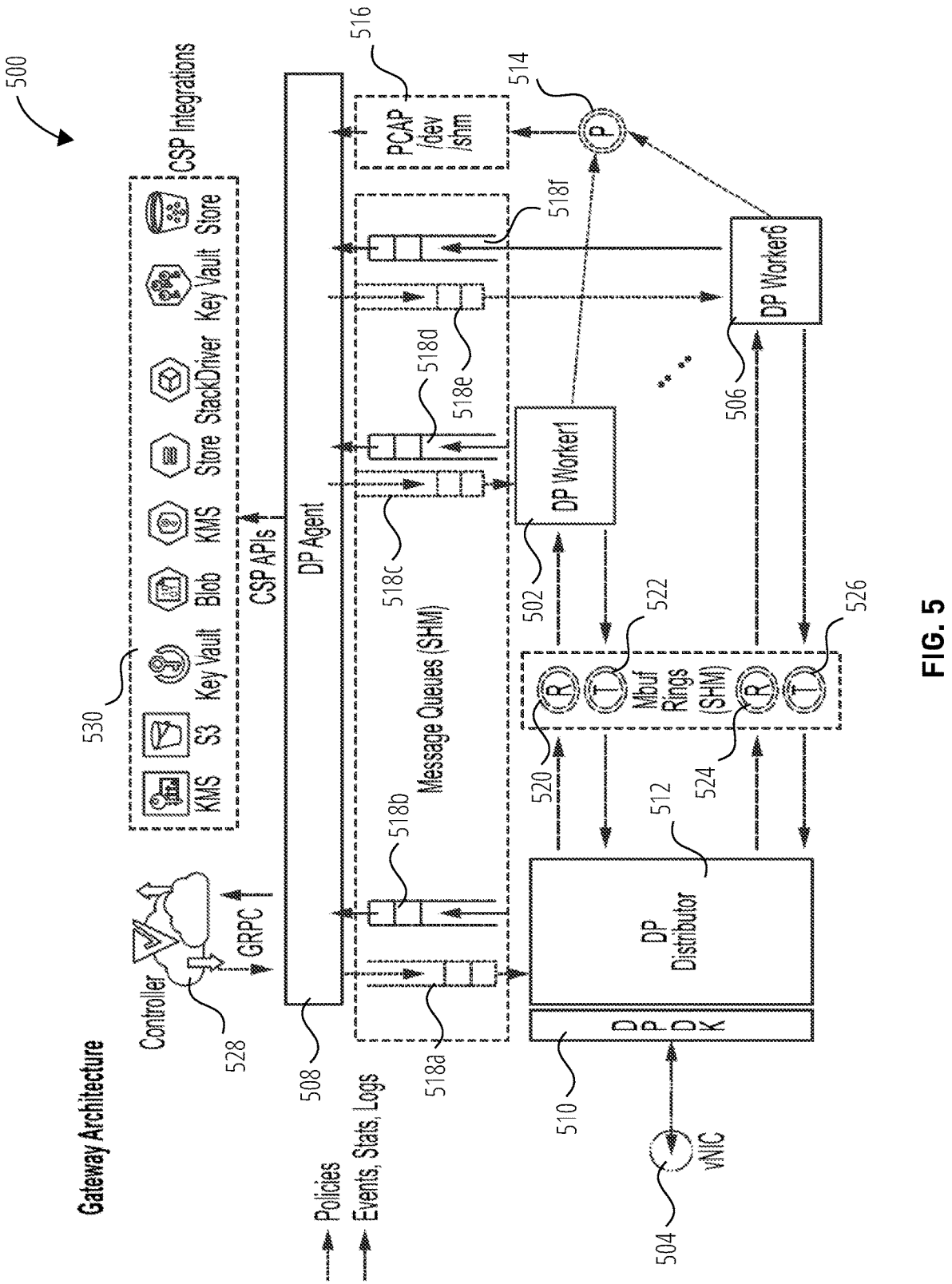
FIG. 5 illustrates an example architecture of a gateway in accordance with some examples of the disclosure.

FIG. 5 illustrates an example architecture of a gateway 500 in accordance with some examples of the disclosure. FIG. 5 illustrates a gateway in a cloud that can function as both a proxy doing content inspection and a forwarding firewall that examines packets on a packet-by-packet basis. This allows the gateway 500 to make determinations about what is malicious or not in a data flow, and then save the entire potentially malicious flow.

As shown in FIG. 5, the gateway 500 is a versatile network component designed to manage and regulate data flows in a wireless network. The gateway 500 serves as a crucial intermediary between various applications and their intended destinations, ensuring security, content inspection, and efficient data forwarding.

The gateway 500 is equipped to receive data flows originating from diverse applications supported within the network. These applications can range from communication tools and cloud-based services to file-sharing platforms. The gateway 500 acts as a centralized point for processing these data flows, providing a consolidated and secure entry point into the network.

One of the primary responsibilities of the gateway 500 is to conduct content inspection and firewall operations on the incoming data flows. By doing so, the gateway 500 analyzes each packet within the flows, enabling it to identify potential threats or malicious elements. This approach allows the gateway 500 to make informed determinations about the nature of the data, ensuring that safe and authorized content reaches its intended destination.

The reason for routing data flows through the gateway 500 before reaching their intended destinations lies in the imperative to bolster network security. By acting as a gatekeeper, the gateway 500 ensures that all incoming data undergoes thorough scrutiny, reducing the risk of malicious elements compromising the network. Additionally, the gateway 500 facilitates the implementation of network policies, content filtering, and quality of service measures, contributing to a secure and optimized flow of information within the network.

As shown in FIG. 5 the gateway 500 can include a virtual network interface card (vNIC) 504. The vNIC 504 serves as a virtualized representation of a physical network interface, the vNIC 504 is responsible for managing the communication between the gateway and the network. The gateway is an instance of potentially multiple such gateways. A sprayer (not shown) sits in front of the gateway and distributes flows across available instances of the gateway. When data flows are received, the vNIC 504 serves as the intermediary component that interacts with the network stack, enabling the gateway to process and analyze the incoming data. Accordingly, the vNIC 504 can receive data flows from various sources, including applications and devices connected to the network. A sprayer such as the data provisioning (DP) distributor 512, acting as a load balancer, directs the flows to specific instances of workers within the gateway, through the data plane development kit (DPDK) 510 to the DP distributor 512. Packets received by the gateway 500 are further sprayed to either the first DP worker 502 or the second DP worker 506. Accordingly, the DP distributor 512 transmits particular data flow toward one of the workers 502, 506, to be stored in a transmission ring 522 or receiving ring of the first DP worker 502, or the receiving ring 524 or transmission ring of the second DP worker 506.

The receiving rings 520, 524, are configured to receive and store transmissions from the DP distributor 512, that are intended for either of the DP workers 502, 506. The transmission rings 522, 526, are configured to receive and store transmissions from the DP workers 502, 506 intended for the DP distributor 512. The transmission rings 522, 526 and the receiving rings 520, 524 serve as buffers before being transmitted to their intended destination. This buffering mechanism helps manage the flow of data, especially when there might be variations in the processing speed of different components within the gateway.

The DP workers 502, 506, upon receiving the assigned data flows are responsible for advancing data packets in the data flows through the inspection pipeline, guided by a firewall policy and an assigned role of the gateway as a forwarding agent or proxy. Concurrently, state information pertaining to the progress of inspections of the data packets by the specific services in the data pipeline are stored in message queues 518a-518f, while the packets remain in transmission 522,526 and receive rings 520,524. The transmission 522,526 and receive rings 520,524 provide a shared memory space where the services of the data pipeline can access the packets.

There can be several instances of the DP workers 502, 506, which provide scalability within gateway instances.

The DP workers 502, 506 apply an inspection policy that is associated with the respective data flow that dictates how data packets in that data flow should be analyzed to detect threat signatures. These policies are configured by the customer through interactions with the controller 528 in accordance with the security requirements and objectives of the customer.

During the analysis of each data packet in the data flow received, DP workers 502 and 506 can determine whether one or more of the data packets are malicious. Data packets identified as non-malicious are cleared from the transmission 522,526 and receive rings 520,524, whereas malicious packets are directed to the P-ring 514 for writing to a PCAP 516 file. The PCAP 516 file is used to store the malicious network traffic data captured by the first DP workers 502 and 506 during packet inspection.

The DP agent 508 can interact with cloud service provider (CSP) 530 APIs to facilitate communication and data exchange between the gateway 500 and cloud services. With respect to the present technology, the DP agent 508 can communicate with the CSPs 530 to transfer of the PCAP 516 to a persistent cloud storage such as S3 or the BLOB associated with the CSPs 530.

Throughout the data pipeline described herein, packets can continue to be streamed to the gateway, where they are buffered and examined. Malicious packets are streamed to the P-ring 514, and then bulk transfers are made to the CSPs 530 for persistent storage. As such, even large transactions can be analyzed through the streaming of packets throughout the pipeline.

Thus, the proposed technology, as described above, focuses on capturing threat-related transactions in a selective manner. These transactions can then be stored in any format, including a specific HAR and PCAP format, which is ideal for cloud-native storage. This format enables the retention of extensive transaction data, providing an advantage over traditional systems.

In some examples, one or more CPU cycles consumed by the gateway can be monitored. The gateway can determine that the CPU cycles consumed have reached a threshold to trigger a need to scale the capacity of the gateway. If the CPU cycles consumed by the gateway exceed a certain threshold, a second instance of the gateway can be created to scale the capacity. This allows the flows to be distributed across multiple gateway instances in a pool of gateways within a cluster. By doing so, the added CPU cycles can be factored in when generating auto-scaling algorithms for the creation of multiple instances of the gateway.

FIG. 6 illustrates a flow chart for inspecting a data flow by a gateway in a cloud in accordance with some examples of the disclosure. Although the example process 600 depicts a particular sequence of operations, the sequence may be altered without departing from the scope of the present disclosure. For example, some of the operations depicted may be performed in parallel or in a different sequence that does not materially affect the function of the process 600. In other examples, different components of an example device or system that implements the process 600 may perform functions at the same time or in a specific sequence.

According to some examples, the method includes receiving the data flow by the gateway, wherein the data flow includes data packets at block 602. For example, the gateway 500 illustrated in FIG. 5 may receive the data flow by the gateway 500, wherein the data flow includes data packets.

In some examples, the gateway is configured as a proxy for a first application. When serving as a proxy, the gateway has the ability to examine the data packets of the data flow. The examination is conducted based on the policy that is linked to the first application for which the gateway is set up as the proxy. When acting as a proxy, the gateway 500 cannot just analyze data packet, but can also analyze collections of data packets making up transactions with the first application. The additional context that the gateway has when acting as a proxy, such as the ability to read the data, HTTP headers, and identify transaction boundaries, allows the gateway 500 to perform additional inspection services on proxy flows. When the proxy flow detects a threat signature, the gateway saves additional context such as the triggering transaction and information about the application.

In some examples, the gateway is configured as a forwarding gateway. In such a configuration, the gateway 500 may perform more limited analyses since the gateway 500 is not privileged to read HTTP headers or learn transaction boundaries. Some such instructions for forwarding policies may be limited to packet-level inspections.

According to some examples, the method includes analyzing the data packets in the data flow using one or more inspection services to detect a threat signature at block 604. For example, gateway 500, illustrated in FIG. 5, may analyze the data packets, using one of its workers, in the data flow using one or more inspection services, such as those illustrated in FIG. 3, to detect a threat signature. The data flow is analyzed in accordance with an inspection policy associated with the data flow, where data packets are identified as triggering the threat signature based on one or more malicious threats being present in data packets in the data flows.

According to some examples, the method includes, in response to the detection of the threat signature, capturing the data packets having the detected threat signature in a temporary storage at block 606. When a threat signature is detected, the gateway 500, shown in FIG. 5, can capture the data packets that contain the signature in a temporary storage, such as P-ring 514 and PCAP 516. The packet capture file is located within the gateway. An example of the packet capture file is PCAP 516.

According to some examples, the method includes forwarding the data packets having the detected threat signature in the temporary storage to a persistent cloud storage and clearing the temporary storage of remaining data packets not associated with the threat signature at block 608. For example, the gateway 500 illustrated in FIG. 5 may forward the data packets having the detected threat signature in the temporary storage to a persistent cloud storage and clearing the temporary storage of remaining data packets not associated with the threat signature. For example, the DP agent 508 of the gateway 500 can forward the PCAP 516 to the CSPs 530 for persistent storage. Accordingly, data packets associated with the threat signature are stored in a HAR or PCAP format in the persistent cloud storage, where the persistent cloud storage is AMAZON S3 or a binary large object (BLOB).

In some examples, the data packets from the data flow are initially streamed to the gateway. Upon detection of a threat signature, these data packets are streamed to the temporary storage, and subsequently, the temporary storage transfers the data packets to the persistent storage. When it is observed that the temporary storage has reached a predetermined threshold, signifying full capacity. While this is rare, a proactive measure is taken to avoid potential bottlenecks in the threat detection pipeline. This involves purging a specific portion of the data packets from the temporary storage, including some of those containing the identified threat signature. Although, the purged portion is lost, at least the data pipeline continues to function to handle packets according to a defined policy, e.g. To drop malicious packets rather than send them to the destination.

Figure 7:
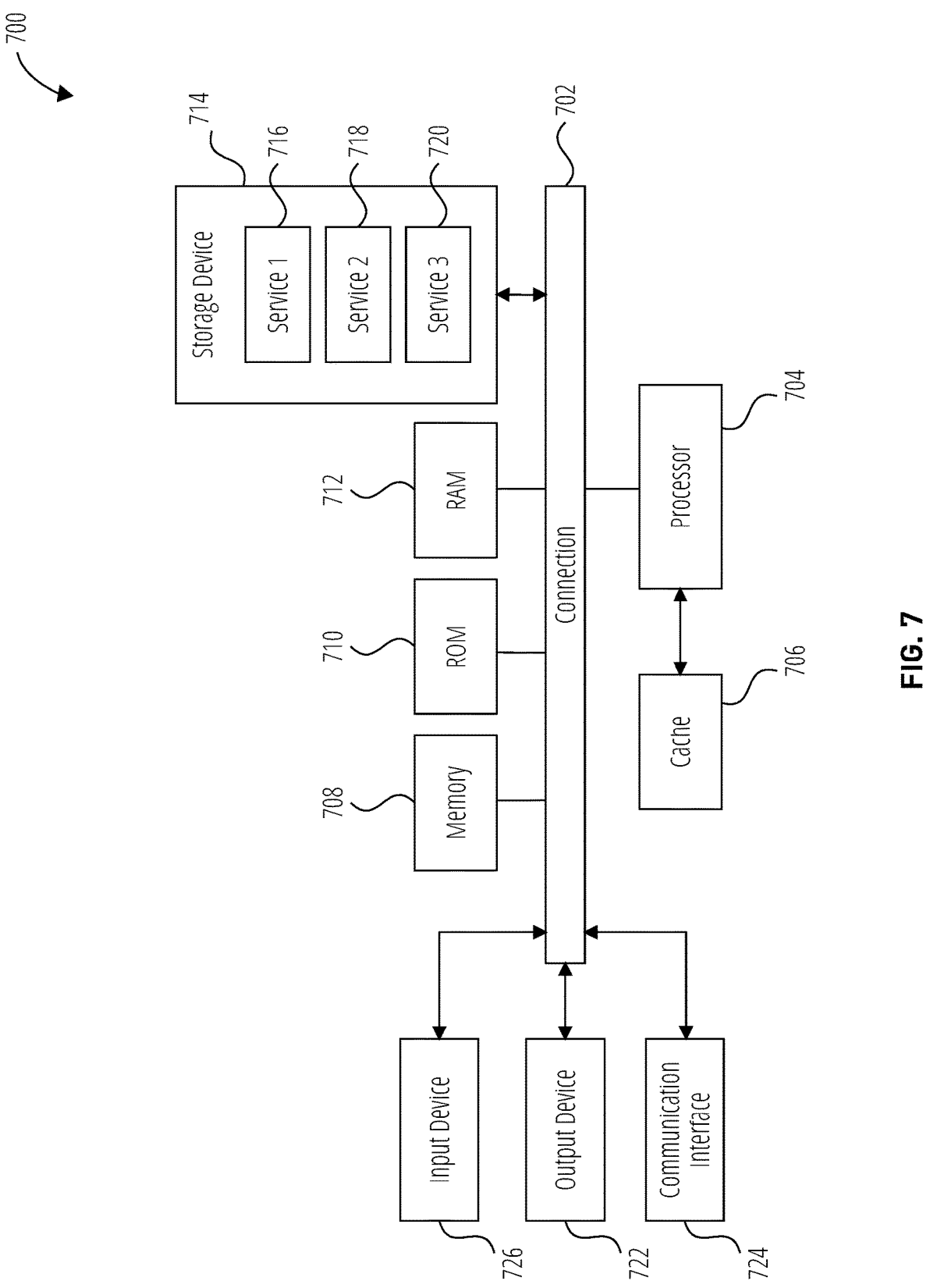
FIG. 7 shows an example of a system for implementing certain aspects of the present technology in accordance with some examples of the disclosure.

FIG. 7 shows an example of computing system 700, which can be for example any computing device making up a gateway, a controller, a DP agent, a DP worker, or any component thereof in which the components of the system are in communication with each other using connection 702. Connection 702 can be a physical connection via a bus, or a direct connection into processor 704, such as in a chipset architecture. Connection 702 can also be a virtual connection, networked connection, or logical connection.

In some embodiments, computing system 700 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example computing system 700 includes at least one processing unit (CPU or processor) 704 and connection 702 that couples various system components including system memory 708, such as read-only memory (ROM) 710 and random-access memory (RAM) 712 to processor 704. Computing system 700 can include a cache 706 of high-speed memory 708 connected directly with, in close proximity to, or integrated as part of processor 704.

Processor 704 can include any general-purpose processor and a hardware service or software service, such as services 716, 718, and 720, stored in storage device 714, configured to control processor 704 as well as a special-purpose processor where software instructions are incorporated into the actual processor design. Processor 704 may essentially be a completely self-contained computing system, containing multiple cores or processors, a bus, memory controller, cache, etc. A multi-core processor may be symmetric or asymmetric.

To enable user interaction, computing system 700 includes an input device 726, which can represent any number of input mechanisms, such as a microphone for speech, a touch-sensitive screen for gesture or graphical input, keyboard, mouse, motion input, speech, etc. Computing system 700 can also include output device 722, which can be one or more of a number of output mechanisms known to those of skill in the art. In some instances, multimodal systems can enable a user to provide multiple types of input/output to communicate with computing system 700. Computing system 700 can include communication interface 724, which can generally govern and manage the user input and system output. There is no restriction on operating on any particular hardware arrangement, and therefore the basic features here may easily be substituted for improved hardware or firmware arrangements as they are developed.

Storage device 714 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read-only memory (ROM), and/or some combination of these devices.

The storage device 714 can include software services, servers, services, etc., that when the code that defines such software is executed by the processor 704, it causes the system to perform a function. In some embodiments, a hardware service that performs a particular function can include the software component stored in a computer-readable medium in connection with hardware components, such as processor 704, connection 702, output device 722, etc., to carry out the function.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can comprise, for example, instructions and data which cause or otherwise configure a general-purpose computer, special purpose computer, or special purpose processing device to perform a certain function or group of functions. Portions of computer resources used can be accessible over a network. The executable computer instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, universal serial bus (USB) devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

For clarity of explanation, in some instances the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program, or a collection of programs that carry out a specific function. In some embodiments, a service can be considered a server. The memory can be a non-transitory computer-readable medium.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general-purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, solid state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Some clauses of the present technology include:

Clause 1. A method for inspecting a data flow by a gateway in a cloud, the method comprising: receiving the data flow by the gateway, wherein the data flow includes data packets; analyzing the data packets in the data flow using one or more inspection services to detect a threat signature, wherein the data flow is analyzed in accordance with an inspection policy associated with the data flow; in response to the detection of the threat signature, capturing the data packets having the detected threat signature in a temporary storage, wherein the temporary storage is a packet capture file within the gateway; and forwarding the data packets having the detected threat signature in the temporary storage to a persistent cloud storage, and clearing the temporary storage of remaining data packets not associated with the threat signature, whereby data packets associated with the threat signature are stored in the persistent cloud storage, wherein the data packets are stored in any format, including a HAR or PCAP format in the persistent cloud storage, wherein the persistent cloud storage is Amazon S3 or a binary large object (BLOB).

Clause 2. The method of clause 1, wherein the gateway is configured as a proxy for a first application, the method further comprising: inspecting the data packets of the data flow, which is a proxy flow, according to a first policy associated with the first application for which the gateway is configured as the proxy for the first application, wherein the data packets make up a first transaction with the first application, wherein the gateway acting as the proxy performs additional inspection services on proxy flows, wherein when the threat signature is detected for the proxy flow saving additional context such as the transaction that triggered the flow, and information about the application.

Clause 3. The method of clause 1, further comprising: identifying a second buffer that meets a predetermined data packet threshold, the second buffer comprising a second set of data packets to be stored in the temporary storage; transmitting data stored in the temporary storage to the cloud storage; and forwarding the second set of data packets to the temporary storage.

Clause 4. The method of clause 1, further comprising: associating the data packets triggering the threat signature with one or more malicious threats.

Clause 5. The method of clause 1, wherein the data packets of the data flow are streaming to the gateway, and when the threat signature is detected the data packets are streamed to the temporary storage, which streams the data packets to the persistent storage.

Clause 6. The method of clause 5, further comprising: detecting the temporary storage has met a predetermined threshold indicating the temporary storage is full; purging a portion of the data packets in the temporary storage to avoid creating a bottleneck in a threat detection pipeline, wherein the portion of the data packets includes the detected threat signature; and storing the purged portion of the data packets in the persistent cloud storage.

Clause 7. The method of clause 1, further comprising: monitoring the CPU cycles consumed by the gateway; determining that the CPU cycles consumed have reached a threshold to trigger a need to scale capacity of the gateway; scaling the gateway by creating a second gateway instance based on the determination that the CPU cycles consumed have reached a threshold to trigger a need to scale the capacity of the gateway, wherein the flows are getting sprayed to multiple gateway instances in a pool of gateways, in a cluster, we can actually account for the additional amount of CPU cycles this, this entails and actually feed that into our auto-scaling algorithms.

Clause 8. A gateway in a cloud comprising: a transceiver; a processor configured to execute instructions and cause the processor to: receive the data flow, wherein the data flow includes data packets; analyze the data packets in the data flow using one or more inspection services to detect a threat signature, wherein the data flow is analyzed in accordance with an inspection policy associated with the data flow; in response to the detection of the threat signature, capture the data packets having the detected threat signature in a temporary storage, wherein the temporary storage is a packet capture file within the gateway; and forward the data packets having the detected threat signature in the temporary storage to a persistent cloud storage, and clearing the temporary storage of remaining data packets not associated with the threat signature, whereby data packets associated with the threat signature are stored in the persistent cloud storage, wherein the data packets are stored in any format, including a HAR or PCAP format in the persistent cloud storage, wherein the persistent cloud storage is Amazon S3 or a binary large object (BLOB).

Clause 9. The gateway of clause 8, wherein the gateway is configured as a proxy for a first application, wherein the instructions further cause the processor to: inspect the data packets of the data flow, which is a proxy flow, according to a first policy associated with the first application for which the gateway is configured as the proxy for the first application, wherein the data packets make up a first transaction with the first application, wherein the gateway acting as the proxy performs additional inspection services on proxy flows, wherein when the threat signature is detected for the proxy flow saving additional context such as the transaction that triggered the flow, and information about the application.

Clause 10. The gateway of clause 8, wherein the instructions further cause the processor to: identify a second buffer that meets a predetermined data packet threshold, the second buffer comprising a second set of data packets to be stored in the temporary storage; transmit data stored in the temporary storage to the cloud storage; and forward the second set of data packets to the temporary storage.

Clause 11. The gateway of clause 8, wherein the instructions further cause the processor to: associate the data packets triggering the threat signature with one or more malicious threats.

Clause 12. The gateway of clause 11, wherein the instructions further cause the processor to: detect the temporary storage has met a predetermined threshold indicating the temporary storage is full; purge a portion of the data packets in the temporary storage to avoid creating a bottleneck in a threat detection pipeline, wherein the portion of the data packets includes the detected threat signature; and store the purged portion of the data packets in the persistent cloud storage.

Clause 13. The gateway of clause 8, wherein the instructions further cause the processor to: monitor the CPU cycles consumed by the gateway; determine that the CPU cycles consumed have reached a threshold to trigger a need to scale capacity of the gateway; scale the gateway by creating a second gateway instance based on the determination that the CPU cycles consumed have reached a threshold to trigger a need to scale the capacity of the gateway, wherein the flows are getting sprayed to multiple gateway instances in a pool of gateways, in a cluster, we can actually account for the additional amount of CPU cycles this, this entails and actually feed that into our auto-scaling algorithms.

Clause 14. A non-transitory computer-readable storage medium comprising instructions, the instructions, when executed by a computing system, cause the computing system to: receive the data flow by the gateway, wherein the data flow includes data packets; analyze the data packets in the data flow using one or more inspection services to detect a threat signature, wherein the data flow is analyzed in accordance with an inspection policy associated with the data flow; in response to the detection of the threat signature, capture the data packets having the detected threat signature in a temporary storage, wherein the temporary storage is a packet capture file within the gateway; and forward the data packets having the detected threat signature in the temporary storage to a persistent cloud storage, and clearing the temporary storage of remaining data packets not associated with the threat signature, whereby data packets associated with the threat signature are stored in the persistent cloud storage, wherein the data packets are stored in any format, including a HAR or PCAP format in the persistent cloud storage, wherein the persistent cloud storage is Amazon S3 or a binary large object (BLOB).

Clause 15. The computer-readable storage medium of clause 14, wherein the instructions further cause the computing system to: inspect the data packets of the data flow, which is a proxy flow, according to a first policy associated with the first application for which the gateway is configured as the proxy for the first application, wherein the data packets make up a first transaction with the first application, wherein the gateway acting as the proxy performs additional inspection services on proxy flows, wherein when the threat signature is detected for the proxy flow saving additional context such as the transaction that triggered the flow, and information about the application.

Clause 16. The computer-readable storage medium of clause 14, wherein the instructions further cause the computing system to: identify a second buffer that meets a predetermined data packet threshold, the second buffer comprising a second set of data packets to be stored in the temporary storage; transmit data stored in the temporary storage to the cloud storage; and forward the second set of data packets to the temporary storage.

Clause 17. The computer-readable storage medium of clause 14, wherein the instructions further cause the computing system to: associate the data packets triggering the threat signature with one or more malicious threats.

Clause 18. The computer-readable storage medium of clause 14, wherein the data packets of the data flow are streaming to the gateway, and when the threat signature is detected the data packets are streamed to the temporary storage, which streams the data packets to the persistent storage.

Clause 19. The computer-readable storage medium of clause 18, wherein the instructions further cause the computing system to: detect the temporary storage has met a predetermined threshold indicating the temporary storage is full; purge a portion of the data packets in the temporary storage to avoid creating a bottleneck in a threat detection pipeline, wherein the portion of the data packets includes the detected threat signature; and store the purged portion of the data packets in the persistent cloud storage.

Clause 20. The computer-readable storage medium of clause 14, wherein the instructions further cause the computing system to: monitor the CPU cycles consumed by the gateway; determine that the CPU cycles consumed have reached a threshold to trigger a need to scale capacity of the gateway; scale the gateway by creating a second gateway instance based on the determination that the CPU cycles consumed have reached a threshold to trigger a need to scale the capacity of the gateway, wherein the flows are getting sprayed to multiple gateway instances in a pool of gateways, in a cluster, we can actually account for the additional amount of CPU cycles this, this entails and actually feed that into our auto-scaling algorithms.

What is claimed is:

1. A method for inspecting a data flow by a gateway in a cloud, the method comprising:

receiving the data flow by the gateway, wherein the data flow includes data packets;

analyzing the data packets in the data flow using one or more inspection services to detect a threat signature, wherein the data flow is analyzed in accordance with an inspection policy associated with the data flow;

in response to the detection of the threat signature, capturing a first set of data packets of the data packets having the detected threat signature in a temporary storage, wherein the temporary storage is a packet capture (PCAP) file within the gateway;

storing a second set of data packets in a buffer, wherein the second set of data packets having the detected threat signature;

forwarding the first set of data packets having the detected threat signature in the temporary storage to a persistent cloud storage, and clearing the temporary storage of remaining data packets not associated with the threat signature, whereby the first set of data packets associated with the threat signature are stored in the persistent cloud storage, wherein the first set of data packets are stored in a HTTP Archive (HAR) or PCAP format in the persistent cloud storage, wherein the persistent cloud storage is AMAZON S3 or a binary large object (BLOB); and forwarding the second set of data packets to the temporary storage.

2. The method of claim 1, wherein the gateway is configured as a proxy for a first application, the method further comprising:

inspecting the data packets of the data flow, which is a proxy flow, according to a first policy associated with the first application for which the gateway is configured as the proxy for the first application, wherein the data packets make up a first transaction with the first application, wherein the gateway acting as the proxy performs additional inspection services on proxy flows, wherein when the threat signature is detected for the proxy flow saving additional context from a transaction that triggered the flow, and information about the application.

3. The method of claim 1, further comprising:

associating the data packets triggering the threat signature with one or more malicious threats.

4. The method of claim 1, wherein the data packets of the data flow are streaming to the gateway, and when the threat signature is detected the data packets are streamed to the temporary storage, which streams the data packets to the persistent cloud storage.

5. The method of claim 4, further comprising:

detecting the temporary storage has met a predetermined threshold indicating the temporary storage is full;

purging a portion of the first set of data packets in the temporary storage to avoid creating a bottleneck in a threat detection pipeline, wherein the portion of the first set of data packets includes the detected threat signature.

6. The method of claim 1, further comprising:

monitoring one or more central processing unit (CPU) cycles consumed by the gateway;

determining that the CPU cycles consumed have reached a threshold to trigger a need to scale capacity of the gateway; and scaling the gateway by creating a second gateway instance based on the determination that the CPU cycles consumed have reached the threshold to trigger the need to scale the capacity of the gateway.

7. A gateway in a cloud comprising:

a transceiver; and a processor configured to execute instructions and cause the processor to:

receive a data flow, wherein the data flow includes data packets;

analyze the data packets in the data flow using one or more inspection services to detect a threat signature, wherein the data flow is analyzed in accordance with an inspection policy associated with the data flow;

in response to the detection of the threat signature, capture the first set of data packets of the data packets having the detected threat signature in a temporary storage, wherein the temporary storage is a packet capture (PCAP) file within the gateway;

store a second s et of data packets in a buffer, wherein the second set of data packets having the detected threat signature;

forward the first set of data packets having the detected threat signature in the temporary storage to a persistent cloud storage, and clearing the temporary storage of remaining data packets not associated with the threat signature, whereby first set of data packets associated with the threat signature are stored in the persistent cloud storage, wherein the first set of data packets are stored in a HTTP Archive (HAR) or PCAP format in the persistent cloud storage, wherein the persistent cloud storage is AMAZON S3 or a binary large object (BLOB); and forward the second set of data packets to the temporary storage.

8. The gateway of claim 7, wherein the gateway is configured as a proxy for a first application, wherein the instructions further cause the processor to:

inspect the data packets of the data flow, which is a proxy flow, according to a first policy associated with the first application for which the gateway is configured as the proxy for the first application, wherein the data packets make up a first transaction with the first application, wherein the gateway acting as the proxy performs additional inspection services on proxy flows, wherein when the threat signature is detected for the proxy flow saving additional context from a transaction that triggered the flow, and information about the application.

9. The gateway of claim 7, wherein the instructions further cause the processor to:

associate the data packets triggering the threat signature with one or more malicious threats.

10. The gateway of claim 9, wherein the instructions further cause the processor to:

detect the temporary storage has met a predetermined threshold indicating the temporary storage is full;

purge a portion of the first set of data packets in the temporary storage to avoid creating a bottleneck in a threat detection pipeline, wherein the portion of the first set of data packets includes the detected threat signature.

11. The gateway of claim 7, wherein the instructions further cause the processor to:

monitor one or more central processing unit (CPU) cycles consumed by the gateway;

determine that the CPU cycles consumed have reached a threshold to trigger a need to scale capacity of the gateway; and scale the gateway by creating a second gateway instance based on the determination that the CPU cycles consumed have reached the threshold to trigger the need to scale the capacity of the gateway.

12. A non-transitory computer-readable storage medium comprising instructions, the instructions, when executed by a computing system, cause the computing system to:

receive a data flow by a gateway, wherein the data flow includes data packets;

analyze the data packets in the data flow using one or more inspection services to detect a threat signature, wherein the data flow is analyzed in accordance with an inspection policy associated with the data flow;

in response to the detection of the threat signature, capture a first set of data packets of the data packets having the detected threat signature in a temporary storage, wherein the temporary storage is a packet capture (PCAP) file within the gateway; and store a second set of data packets in a buffer, wherein the second set of data packets having the detected threat signature;

forward the first set of data packets having the detected threat signature in the temporary storage to a persistent cloud storage, and clearing the temporary storage of remaining data packets not associated with the threat signature, whereby first set of data packets associated with the threat signature are stored in the persistent cloud storage, wherein the data packets are stored in a HTTP Archive (HAR) or PCAP format in the persistent cloud storage, wherein the persistent cloud storage is AMAZON S3 or a binary large object (BLOB); and forward the second set of data packets to the temporary storage.

13. The computer-readable storage medium of claim 12, wherein the instructions further cause the computing system to:

inspect the data packets of the data flow, which is a proxy flow, according to a first policy associated with a first application for which the gateway is configured as the proxy for the first application, wherein the data packets make up a first transaction with the first application, wherein the gateway acting as the proxy performs additional inspection services on proxy flows, wherein when the threat signature is detected for the proxy flow saving additional context from a transaction that triggered the flow, and information about the first application.

14. The computer-readable storage medium of claim 12, wherein the instructions further cause the computing system to:

associate the data packets triggering the threat signature with one or more malicious threats.

15. The computer-readable storage medium of claim 12, wherein the data packets of the data flow are streaming to the gateway, and when the threat signature is detected the data packets are streamed to the temporary storage, which streams the data packets to the persistent cloud storage.

16. The computer-readable storage medium of claim 15, wherein the instructions further cause the computing system to:

detect the temporary storage has met a predetermined threshold indicating the temporary storage is full;

purge a portion of the first set of data packets in the temporary storage to avoid creating a bottleneck in a threat detection pipeline, wherein the portion of the first set of data packets includes the detected threat signature.

17. The computer-readable storage medium of claim 12, wherein the instructions further cause the computing system to:

monitor one or more central processing unit (CPU) cycles consumed by the gateway;

determine that the CPU cycles consumed have reached a threshold to trigger a need to scale capacity of the gateway; and scale the gateway by creating a second gateway instance based on the determination that the CPU cycles consumed have reached the threshold to trigger the need to scale the capacity of the gateway.

18. The gateway of claim 7, wherein the data packets of the data flow are streaming to the gateway, and when the threat signature is detected the data packets are streamed to the temporary storage, which streams the data packets to the persistent cloud storage.

19. The method of claim 1, wherein the gateway is auto-scalable when a threshold is met.

20. The gateway of claim 7, wherein the gateway is auto-scalable when a threshold is met.

\* \* \* \* \*